HARTPENCE & BOWNE.
Plow.
No. 259.  Patented July 5, 1837.
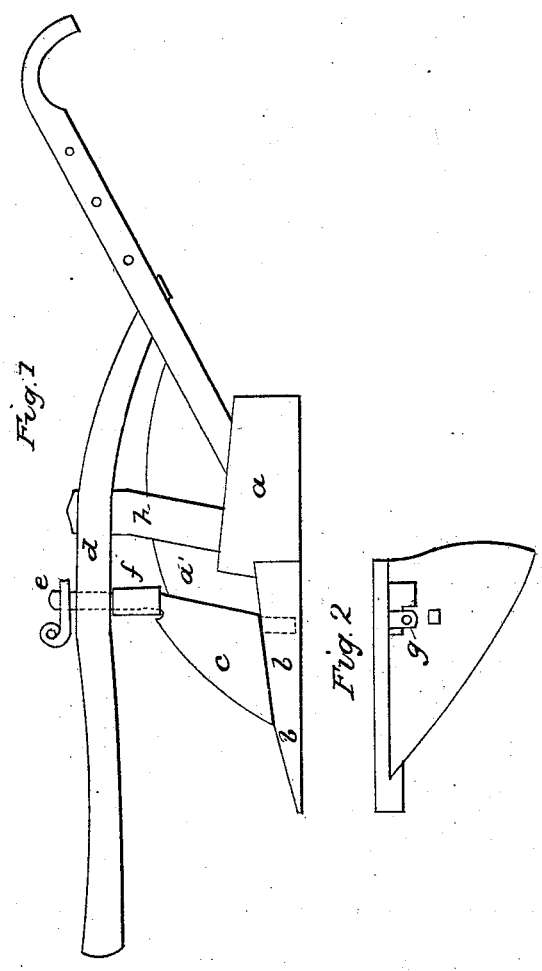

UNITED STATES PATENT OFFICE.

SAMUEL HARTPENCE AND JOHN D. BOWNE, OF KINGWOOD, NEW JERSEY.

IMPROVEMENT IN PLOWS.

Specification forming part of Letters Patent No. 259, dated July 5, 1837.

*To all whom it may concern:*

Be it known that we, SAMUEL HARTPENCE and JOHN D. BOWNE, of Kingwood, in the county of Hunterdon and State of New Jersey, have invented certain Improvements in Plows; and we do hereby declare that the following is a full and exact description thereof.

In this plow the mold-board and the principal part of the landside are cast in one entire piece, while the share and point form another piece, which is also cast or wrought. The point may be in a separate piece, so as to be renewed. The cutter or forward edge of the plow is formed of wrought-iron, and is so made as to operate not only as a cutter, but also as a bolt or holdfast descending through to the under side of the share and up through the beam, where by means of a screw-nut it serves to attach all these parts together.

Figure 1 in the accompanying drawings represents the landside of this plow, $a\ a'$ being that part of it which is cast with the mold-board; $b\ b$, the share and point; and $c$, the wrought-iron cutter, which may be steeled upon the edge. The upper part of this cutter, above the cutting-edge, is rounded and terminates in a screw-bolt passing through the beam $d$, and is drawn up by the screw-nut $e$. Upon the rounded part of the bolt, between the cutting-edge and the beam, there is a roller, $f$, which by turning freely upon the rounded portion relieves this part of the plow from being clogged and obstructed by stubble, twigs, &c. The lower part of the cutter is lengthened out, so as to form a clip or holdfast on its lower end, which passes through the sole of the share, and thus enables the screw-nut to draw it up firmly against the bottom of the mold-board and landside.

Fig. 2 represents the under part of the share, through the mortise or opening $g$ in which the bent or holdfast end of the cutter passes, and by which it is drawn up, as above described. A screw-bolt passing through it and the lower edge of the mold-board attaches the whole securely together. The part $a'$ of the landside is so formed in the casting as to make a secure bearing for the standard $h$, which is firmly bolted in its place.

What we claim as our improvement in the above-described plow, and which we desire to secure by Letters Patent, is—

1. The manner of constructing the cutter with a screw-bolt above, passing through the beam, and a holdfast or clip below, passing through the piece forming the share and point, made in the manner set forth, and holding the whole together, substantially as described.

2. The placing of a roller upon the rounded part above the cutter, as herein shown, for the purpose of preventing the clogging of the plow.

SAMUEL HARTPENCE.
    JOHN D. BOWNE.

Witnesses:
 JAMES N. READING,
 SAMUEL HILL.